United States Patent
Gouteron et al.

[11] 3,902,006
[45] Aug. 26, 1975

[54] JUNCTION BOX

[75] Inventors: Bernard Gouteron, Decines; Pierre Jay, St. Didier au Mont d'Or; Jean-Philippe Rieux, Decines, all of France

[73] Assignee: Rhone-Progil, Paris, France

[22] Filed: Nov. 15, 1972

[21] Appl. No.: 306,831

[30] Foreign Application Priority Data
Nov. 19, 1971 France .............................. 71.42333

[52] U.S. Cl. ............. 174/88 R; 117/232; 174/76; 174/78; 260/28; 264/272
[51] Int. Cl. .............. H02g 15/10; B44d 1/42
[58] Field of Search ..... 117/232, 168; 260/28.5 AS, 260/28; 264/272; 174/52 PE, 76, 88 R, 78

[56] References Cited
UNITED STATES PATENTS

| | | | |
|---|---|---|---|
| 1,761,203 | 6/1930 | Fox | 174/52 PE |
| 2,765,288 | 10/1956 | Whittier et al. | 117/132 BE |
| 2,976,256 | 3/1961 | Whittier et al. | 117/232 X |
| 3,213,187 | 10/1965 | Kish | 174/78 X |

OTHER PUBLICATIONS
Lee et al., *Handbook of Epoxy Resin*, pp. 13-7 to 13-13, (1967).
Harper, *Electronic Packaging with Resins*, pp. 1-4, 146-147, 152-153, (1961).
Lee et al., *Handbook of Epoxy Resins*, pp. 17-23, 17-25, 23-16, 23-20.

*Primary Examiner*—Harry J. Gwinnell
*Attorney, Agent, or Firm*—Browdy and Neimark

[57] ABSTRACT

An easily shatterable dielectric insulating material is provided for junction boxes and other locations where it is desired to break the insulated material when it is necessary to intervene for modifying the junction. The insulating material, which has the good properties of good adherence to the electrical components regardless of temperature and which may be cast at ambient temperatures, comprises at least about 50 % by weight of coal tar pitch based on the total composition as well as a cross-linkable resin, a reactive diluent and a resin-hardening agent.

4 Claims, 1 Drawing Figure

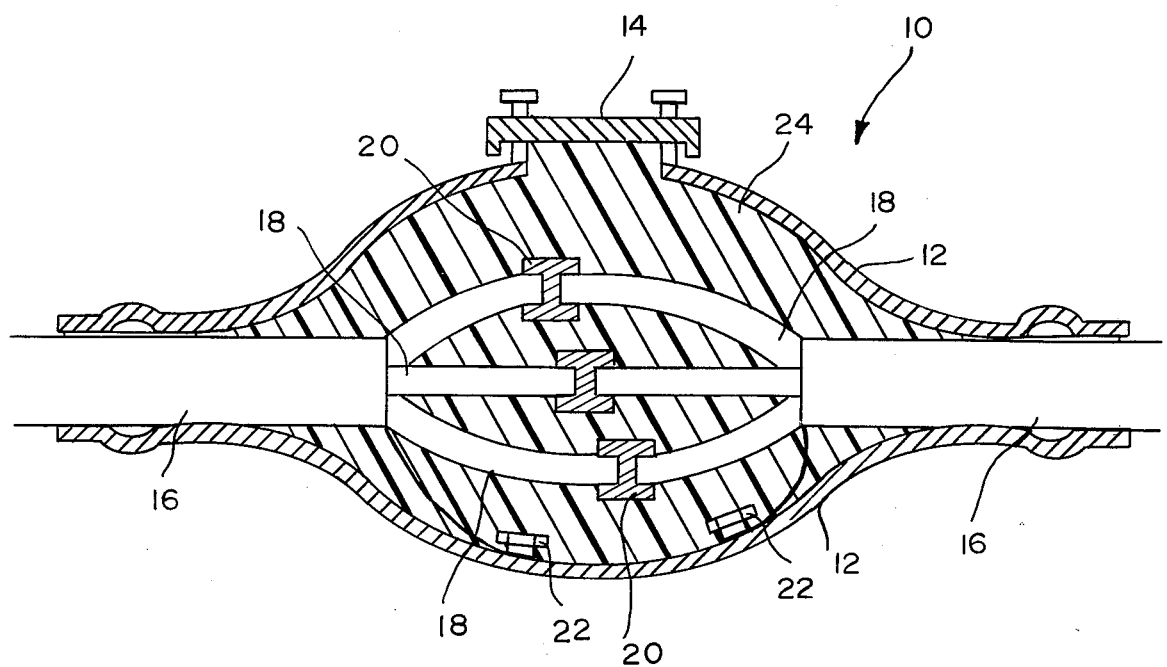

JUNCTION BOX

FIELD OF THE INVENTION

The present invention relates to junction boxes or the like, and more particularly, to new hardening compositions, mainly composed of coal tar pitch and cross-linkable resin, for use in junction boxes, electrical derivation boxes or other electrical network locations.

BACKGROUND

In the conductor insulation field, bitumen is commonly used as a conductor insulation in junction boxes, such as at derivation points of underground electrical lines. Indeed, bitumen has many advantages for this type of insulation. Besides having desirable dielectric properties, bitumen has the advantage of softening under the influence of temperature increase at relatively low temperatures so that it adheres continuously to the electrical cables when they expand under the influence of heat generated from electrical current, and then contract again to initial size when the electrical current ceases to flow and the lines cool. This good adherence prevents moisture penetration along the electrical lines as far as the junction. Moreover, bitumen used for this purpose has a relatively low resilience, i.e., it is relatively brittle, and accordingly it is possible to break the bitumen easily when it is necessary to intervene for modifying the junction.

However, along with its good properties bitumen has certain disadvantages. Thus it is necessary to cast this material in the molten condition, and this is often difficult in the field and requires heating equipment. In addition, after casting in the molten state, the bitumen shrinks greatly upon solidification and there must then be a supplementary casting to fill voids created by shrinkage upon solidification.

Many attempts have been made to overcome the above-identified disadvantages of the use of bitumen in this environment. Thus, in place of bitumen there have been used other castable and cold-hardenable synthetic resins. Unfortunately, however, compositions used as a substitute for bitumen have not been satisfactory, either because they do not adhere to the electrical lines in a satisfactory manner, e.g., they do not possess properties allowing them to maintain adherence under the expansion and contraction of the lines as they become heated and cooled, or such contemplated replacement compositions have not been sufficiently brittle to permit them to be easily broken away when it is necessary to modify the junction. Among these previous attempts at substitution compositions have been included formulations based on resins containing a minor, i.e., less than 50 percent, quantity of tar; these compositions have invariably been ineffective since the hardened masses are not sufficiently brittle.

SUMMARY OF THE INVENTION

It is, accordingly, an object of the present invention to overcome the deficiencies of the prior art such as indicated above.

It is another object of the present invention to provide for improved electrical juncture boxes.

It is another object of the present invention to provide for improved, easily replaceable and easily removable electrical insulation for electrical juncture boxes.

It is another object of the present invention to provide improved electrical material insulation.

These and other objects are attained in accordance with the present invention by using as the composition surrounding the electrical juncture, a mixture comprising a cross-linkable resin, a reactive diluent, a resin-hardening agent and coal tar pitch, the coal tar pitch being present in an amount which constitutes at least about 50% of the total weight of the composition.

The above and other objects, as well as the nature and advantages of the instant invention will be more apparent from the following detailed description of certain embodiments, it being understood that the following embodiments are illustrative only.

BRIEF DESCRIPTION OF DRAWING

The sole FIGURE is a cross sectional view of a conventional arrangement of a junction box in which the potting composition of the present invention is utilized.

DETAILED DESCRIPTION OF THE EMBODIMENTS

The electrical junctions are provided with an easily removable potting composition in accordance with the present invention, which, as indicated above, contains fundamentally at least a cross-linkable resin, a reactive diluent, a resin-hardening agent and coal tar pitch. It is essential, however, that the coal tar pitch constitutes at least 50 percent by weight of the total composition. This easily removable potting composition surrounds the electrical junction in the same manner in which prior compositions, such as pure bitumen, have been used.

However, the new easily removable potting composition overcomes the above recited disadvantages of the prior art. Thus, the new easily removable potting compositions are castable at room temperature and hardenable without the use of any applied heat. The hardened masses adhere very well to the electrical lines at all normal temperatures, regardless of whether or not electricity is flowing through the lines thereby generating heat. In addition, the solidified composition has relatively low resilience and may be easily broken away when it becomes necessary or desirable to modify the electrical conductor junction.

The cross-linkable resins and reactive diluents used in accordance with the present invention may be selected from a wide listing, it being understood that it is only necessary that they be mutually compatible and compatible with the coal tar pitch. Thus the cross-linkable resins may be selected from those resins which are subject to polyaddition, polycondensation, or even those which lead to polymers by any other type of reaction mechanism. Among such cross-linkable resins there may be mentioned resins resulting from polyaddition of a polyisocyanate on a polyol.

However, the resin class which is the most preferred for the cross-linkable resin is the epoxy resin class. Of these the di- or tri-functional epoxides are preferred. Of these there may be mentioned the aliphatic, cycloaliphatic or aromatic di- or triepoxides, especially the products resulting from condensation, on an epihalohydrin, such as epichlorohydrin, of an aromatic polyol such as trimethylolpropane or hexanediol, or of a diphenol such as 4,4'-diphenylhlpropane (bisphenol A) or of its hydrogenated derivative, dicyclohexanolpropane. One of the most advantageous compounds appears to be the diglycidyl ether of 4,4'-diphenylolpropane, commonly designated under the name of diepoxided bisphenol A. It is also possible to use polyepoxyethers resulting from the condensation of diepoxides on polyols, such as described in co-pending application Ser. No. 150,743, filed June 7, 1971 and coassigned with the present application. Other suitable epoxy resins may be selected from those known and in this regard reference may be had to *Epoxy Resins*, Skeist et al., Reinhold Publishing Corp., 1959.

By a reactive diluent what is meant is a liquid compound intended for decreasing the viscosity of the entire composition and having a reactive function, i.e., a reactive moiety or radical, capable of entering into the cross-linking reaction induced by the hardening agent. The preferred reactive diluents are monoepoxided compounds, particularly alkylglycidic ethers such as butylglycidyl ether, phenylglycidyl ether, allylglycidyl ether, or styrene oxide. Of course selection of the reactive diluent will in part depend upon the cross-linkable resin used as well as the hardening agent, it being understood that the above mentioned monoepoxided compounds are particularly suitable for use with epoxy resins as the cross-linkable resin and the use of hardening agents normally used with epoxy resins.

Hardening agents used in the present invention may be selected from the conventional hardening agents normally used in conjunction with the selected resins. Thus, with epoxy resins, amine compounds having labile hydrogen are preferably used, such as aliphatic liquid amines, including diethylene-triamine, triethylene tetramine, ethylene-diamine or tetraethylene-pentamine; cycloaliphatic amines, including piperidine; aromatic amines including metaphenylene diamine; aliphatic primary-tertiary amines including diethylaminopropyl-amine and dimethylaminopropylamine; amino-amides or amido-amines including dicyandiamide; hydrolysable imines; sulfurated derivatives including diamino-diphenyl sulfone. It will be understood that there are many epoxy hardening agents which may be used besides those mentioned above.

It is clear that in the present description the expressions "cross-linkable", "reactive diluent" and "hardening agent" are understood to mean not only individual compounds, but also mixtures of compounds. it will be especially understood that in particular commercial preparations sometimes comprise mixtures of resins, diluents and/or hardening agents, and these may be used in the present invention.

The coal tar pitch used in the present invention may be any coal tar distillation residue available on the market; it is not necessary that it have precise characteristics. On the other hand, the minimum content of the coal tar pitch in the composition is a fundamental and critical aspect of the present invention. Thus, it has been found that unless the quantity of coal tar pitch is at least about 50 percent by weight of the total composition, the desired properties will not be attained. While there is no critical maximum quantity of coal tar pitch, practical consideration including the castability of the final composition, dictate a maximum quantity of coal tar pitch in the area of about 70 percent by weight of the total composition. Accordingly, the preferred range of pitch in the total composition lies between 50 and 70 percent by weight.

The proportions of the other constituents, which must be used in the compositions according to the present invention, are not as critical as the minimum proportion of pitch. Nevertheless, in a general way the preferred composition constitutes between 10 and 30 percent by weight of the cross-linkable resin, between 8 and 20 percent by weight of the reactive diluent and between 2 and 10 percent by weight for the hardening or cross-linking agent, each being based on the total weight of the mixture exclusive of non-essential ingredients.

Other non-essential ingredients or adjuvants may be added to the mixture, it being understood that the quantity of pitch must still be at least 50 percent by weight based on the total weight of the mixture including any additional adjuvants. These adjuvants include hardening accelerating agents, such as tertiary amines, alkanolamines, Lewis compounds, thioglycolic acids, polymercaptans, and phenolic compounds such as phenol, cresols, and dimethylaminomethylphenol; acid-alcohols such as salicylic acid or lacitic acid; surface-active agents; adhesive power-improving agents such as pine oil, anthracenic oils, fatty amines, etc.

Prior to casting the composition about the electrical junction, the composition is prepared as two separate components, one of which preferably contains the coal tar pitch, the crosslinkable resin and the diluent, and the other of which contains the hardening agent. Immediately prior to usage the two constituents are mixed and are then cast about the electrical juncture.

Systems of two constituents are well known in the polymer field and permit, as is also well known, the separate preparation and storage of the two components intended for co-reaction at some subsequent time. In the present case, the first constituent is prepared by melting the pitch by heating it at a convenient temperature, generally about 90° to 130°C, and then adding, successively or simultaneously, the cross-linking resin and reactive diluent, preferably while stirring so as to obtain a relatively homogeneous mixture. The first constituent is then ready for use and is stable over an extended period. The viscosity of this mixture, after preparation and cooling, depends somewhat on the quantity of pitch used, as well as on the nature and respective proportions of the resin and the diluent. In general, however, if the first constituent consists of 50 to 60 percent pitch, 15 to 25 percent diepoxided bisphenol A as a cross-linkable resin, and 12 to 15 percent of styrene oxide as the reactive diluent, all calculated with regard to the total composition including the second constituent, the first constituent has a viscosity of about 80 to 90 poises, measured on a Brookfield device at 60 r/min.

The second constituent is, in the simplest case, constituted entirely of the hardening agent. It is, of course, possible to add other ingredients, which do not react with the hardening agent, to this second constituent. In particular if it is contemplated to incorporate in the composition the complementary adjuvants mentioned above, these may be added either wholly or partly to either the first or second constituent on condition, of course, that they are non-reactive with the other ingredients in the constituent to which they are added.

The mixture of the two constituents is carried out at the time of usage of the composition. The constituents may be mixed in any normal way, such as by the use of machinery or by hand such as with a mixing paddle. The pot life of the mixed composition, i.e., the time between mixing and the time of mass setting, is entirely adequate to achieve casting without any difficulty at the specified utilization point. As an example, it may be mentioned that a composition comprising coal tar pitch, diepoxided bisphenol A, styrene oxide as the reactive diluent, triethylene-tetramine as the hardening agent, and phenol as an accelerating agent has, for a mass of about 1.5 liters a "pot life" ranging between 30 minutes and 1 hour at room temperature (20°–25°C) depending on the precise proportions of the components. This time may be adjusted by a convenient choice of the co-reactants.

Upon mixing the two constituents the resultant composition is simply used in the same manner in which bitumen has been used in the past, except that the composition is cast at ambient temperatures instead of in the molten state. The resultant composition adheres tightly to the electrical lines providing good insulation and physical protection. When it is desired to make adjustments at the electrical juncture, the cured composition is easily broken. It may be mentioned that casting in junction boxes of electrical conductors is an easy operation which does not need any particular care or skill. The compositions harden in a few hours, giving a protective mass which combines the good characteristic of adherence to the electrical lines as well as good electrical insulating or dielectric properties. The composition may be used in analogous situations, such as in building works in order to effect temporary sealings.

The FIGURE shows a conventional arrangement of a junction box 10 having a pair of castings 12 and a cover 14 for providing egress to the interior of the box 10, the cover 14 being maintained in place by a pair or more of bolts. A pair of electrical cables 16 pass into the interior of the castings 12 through end openings, and are joined at the interior thereof. Thus, in the conventional embodiment exemplified, each cable contains three wires 18 as well as a ground wire which is connected to a ground 22. Each of the wires 18 of one cable 16 are joined to a corresponding wire of the other cable 16 by a connector 20. The brittle potting composition 24 of the present invention is cast within the juncture box 10 within the castings 12 as described above.

The invention will be better understood from the following examples which illustrate, but are not intended to limit, the invention.

EXAMPLE 1

Compositions according to the invention have been made in preparing a system of two constitutents (percentages are by weight, with regard to total composition) containing 1. 60 percent of pitch having a softening point 38/41 (Kramer Sarnov) heated at 100°C, 12,8% of diepoxided bisphenol A, designated under the name of Epikote 828 (RTM); 13.2 percent of a diluent identified in Table 1, below, and 5 percent of phenol as hardening accelerating agent.

2. 5.3 percent triethylene tetramine as an hardening agent, 1.2 percent of a tertiary amine having the commercial designation of DMP 30 as an accelerating agent and 2.5 percent of pine oil as adherence improving agent.

After cooling the pitch containing mixture to room temperature, the two constituents were mixed with stirring, for several seconds. Those compositions were cast in molds of sizes 15 × 10 × 3.5 mm, and were hardened for 72 hours; they were then submitted to tests to measure their resistance to impact. For this test a Dynstat flexometer with a pendulum having a weight of 285.7 g. was used; test samples placed vertically were submitted to pendulum impact, and the minimal deviation angle, with regard to the vertical, from which the pendulum broke the test samples was determined.

The exact nature of the diluent used in every case and the test results (average value calculated for 15 test samples) are set forth in Table 1 hereinafter.

Table 1

| Composition Reference | Diluent Nature | Weight Ratio | Deviation Angle |
|---|---|---|---|
| A | phenyl-glycidyl ether | | 5° |
| B | Styrene oxide | | 7° |
| C | Styrene oxide Butyl glycidyl ether | 85/15 | 9° |
| D | Styrene oxide butyl glycidyl ether | 50/50 | 12° |
| E | Butyl glycidyl ether | | 25° |

As it may be observed from the values obtained for the measured angle, the test samples are shock brittle, which makes the compositions very useful for junction boxes of electrical cables.

As a comparison, similar tests were made with test samples of crystalline polystyrene, the brittleness of which is very known and it was established that minimal deviation from which such test samples are broken is 75°.

EXAMPLE 2

There was prepared, as explained in the previous example, a composition having the following formulation:

| | Wt. % |
|---|---|
| Pitch | 56 |
| diepoxided bisphenol A | 15 |
| styrene oxide | 15 |
| phenol | 5.5 |
| triethylene-tetramine | 4.5 |
| DMP 30 | 1 |
| pine oil | 3 |

On this composition, the following electrical measurements were made:

1. immediately after mixture
   Resistivity determined for 500 volts at 34°C after 1 minute: $3.4 \times 10^8 \times$ cm
   Dielectric rigidity determined according to the standard CEI, publ. 243: 6 kvolts for a clearance of 2.5 mm.

2. after hardening of 72 hours
   Resistivity determined under 500 volts at 24°C after 1 minute: $2.7 \times 10^{12} \times$ cm
   Transversal dielectric rigidity determined according to the standard CEI, publ. 243
   35 kvolts for a clearance of 1 mm.

EXAMPLE 3

As explained in the previous examples a composition was made from:

| | Wt. % |
|---|---|
| pitch | 65 |
| Trimethylolpropane triglycidylether (epoxy rate 11.36%) | 14 |
| styrene oxide | 10.7 |

-Continued

| | |
|---|---|
| phenol | 6.5 |
| diethylenetriamine | 3.8 |

This composition is perfectly convenient for junction boxes of electric cables.

EXAMPLE 4

A composition according to the invention has been achieved from:

| | Wt. % |
|---|---|
| Pitch | 51.5 |
| diepoxided bisphenol A | 18.9 |
| styrene oxide | 15.5 |
| phenol | 5 |
| triethylene tetramine | 5.1 |
| DMP 30 | 1 |
| pine oil | |

The above composition is useful for casting in electrical junction boxes.

The foregoing description of specific embodiments will so fully reveal the general nature of the invention that others can, by applying current knowledge, readily modify such specific embodiments and/or adapt them to various applications without departing from the generic concept, and, therefore, such adaptations and modifications should and are intended to be comprehended within the meaning and range of equivalence of the disclosed embodiments. It is to be understood that the phraseology or terminology employed herein is for the purpose of description and not of limitation.

What is claimed is:

1. An electrical network junction box comprising an electrical juncture surrounded with a hardened easily frangible protective dielectric insulating potting composition, wherein the improvement comprises said easily frangible protective potting composition consisting essentially of a cross-linked mixture of a cross-linkable resin, a reactive diluent, a hardening agent and coal tar pitch, said coal tar pitch constituting at least about 50 percent of the total weight of the mixture and said cross-linkable resin constituting 10-30 percent of the total weight of the mixture.

2. A junction box in accordance with claim 1 wherein said cross-linkable resin is selected from the group consisting of di- and tri-epoxide resins, and said reactive diluent is a monoepoxide compound.

3. A junction box in accordance with claim 2 wherein said cross-linkable resin is the diglycidyl ether of 4,4'-diphenylolpropane or trimethylolpropane triglycidyl ether, and said reactive diluent is styrene oxide.

4. A junction box in accordance with claim 1, wherein said easily frangible protective potting composition further includes an adjuvant of hardening accelerating agents or adhesive improving agents.

* * * * *